July 27, 1937.  C. C. FARMER  2,088,166
FLUID PRESSURE BRAKE
Filed May 7, 1936  2 Sheets-Sheet 1
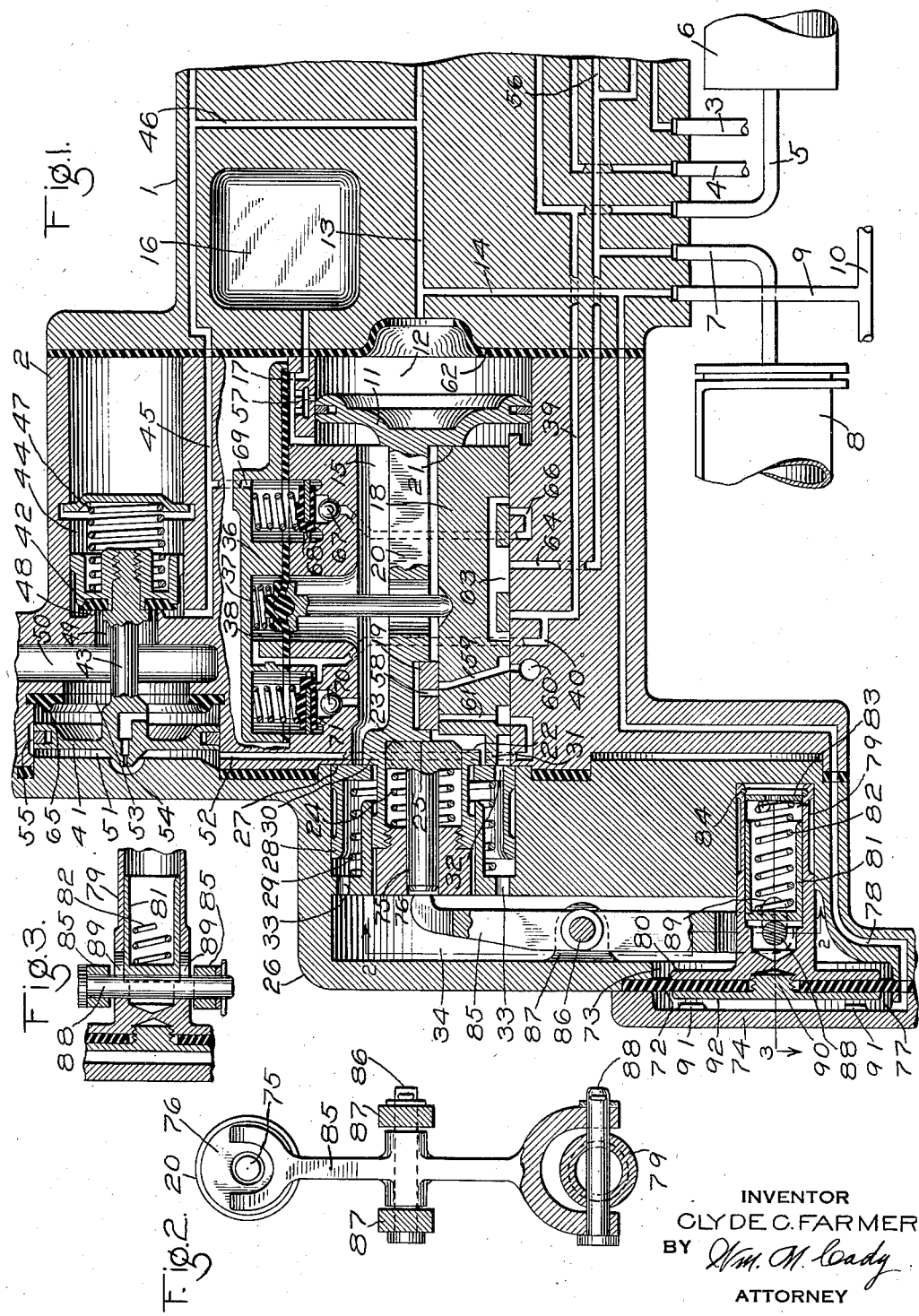
INVENTOR
CLYDE C. FARMER
BY Wm. M. Cady
ATTORNEY

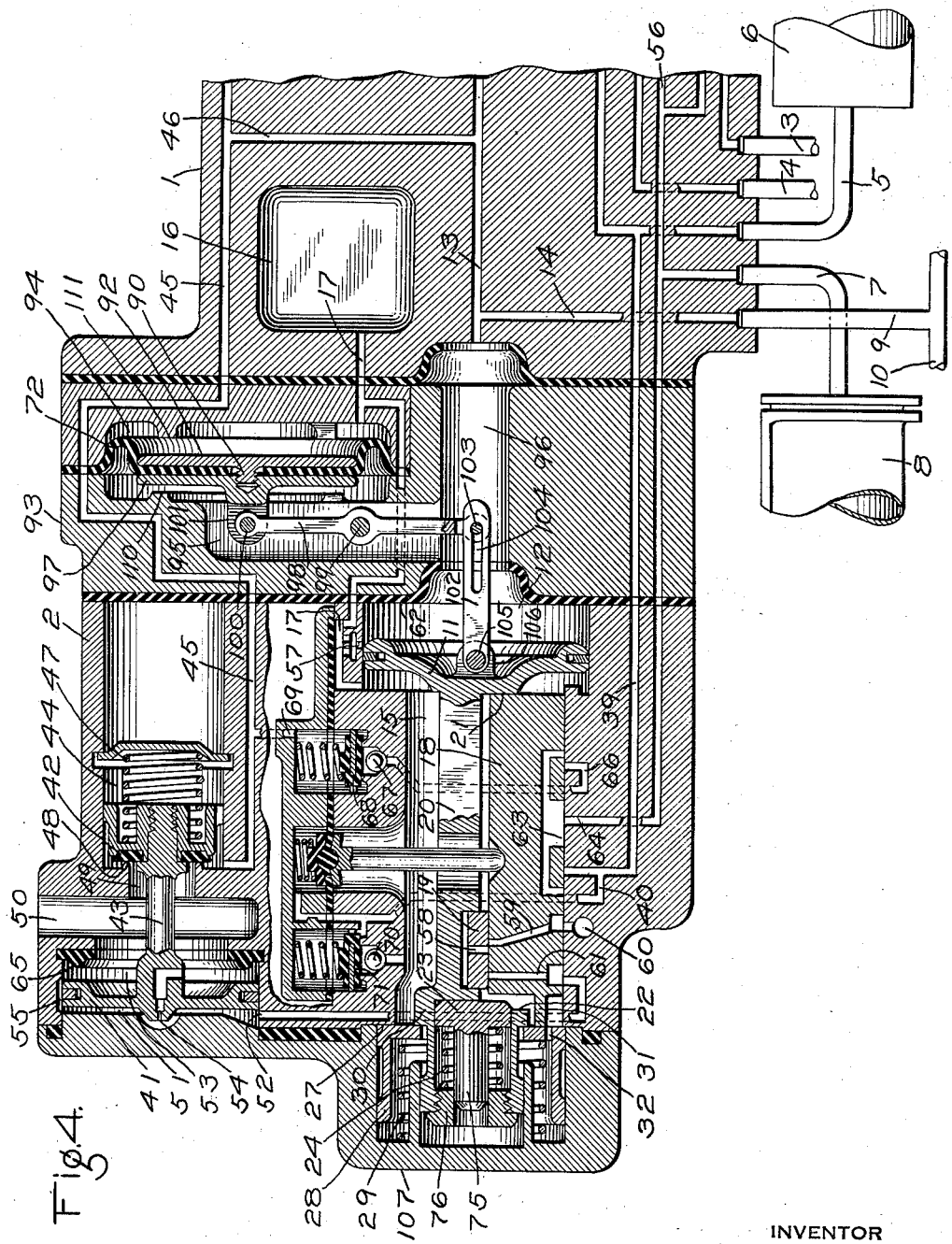

Patented July 27, 1937

2,088,166

UNITED STATES PATENT OFFICE 2,088,166

FLUID PRESSURE BRAKE

Clyde C. Farmer, Pittsburgh, Pa., assignor to The Westinghouse Air Brake Company, Wilmerding, Pa., a corporation of Pennsylvania Application May 7, 1936, Serial No. 78,422

21 Claims. (Cl. 303—45)

This invention relates to fluid pressure brakes and more particularly to the type adapted to operate upon a reduction in brake pipe pressure to effect an application of the brakes and upon an increase in brake pipe pressure to effect a release of the brakes.

In Patent No. 2,031,213 issued to Clyde C. Farmer on February 18, 1936, there is disclosed a brake controlling valve device which comprises a service portion adapted to operate upon a service reduction in brake pipe pressure to effect a service application of the brakes, and an emergency portion adapted to operate along with the service portion upon an emergency reduction in brake pipe pressure to effect an emergency application of the brakes.

The emergency portion just referred to comprises a piston controlled by the opposing pressures of the brake pipe and a quick action chamber and adapted to respond to a service reduction in brake pipe pressure to move an auxiliary slide valve relative to a main slide valve to a service position for venting fluid under pressure from the quick action chamber at the same rate as the brake pipe pressure is reduced, so as to prevent movement of the parts past service position upon a service reduction in brake pipe pressure. The communication through which fluid under pressure is thus vented from the quick action chamber is so restricted however that the pressure in said chamber cannot reduce as fast as the brake pipe pressure is reduced upon an emergency reduction, in which case sufficient differential of pressures is obtained on said piston to move same and the auxiliary slide valve relative to the main slide valve past the service position to an emergency position in which fluid under pressure is supplied from the quick action chamber to a brake pipe vent valve device which is operated thereby to effect a sudden emergency reduction in brake pipe pressure. The emergency piston is then adapted to respond to this emergency reduction in brake pipe pressure and move the main slide valve to a position for supplying fluid under pressure to the brake cylinder for applying the brakes.

The emergency piston and auxiliary slide valve are designed to be moved to service position when a small differential, such as .4 of a pound, is obtained between the pressures in the brake pipe and quick action chamber upon a reduction in brake pipe pressure. Spring means are provided to come into action about the time the auxiliary slide valve reaches service position to oppose movement of the piston and auxiliary slide valve past service position until the differential of pressures on the piston is increased a predetermined degree, such as .5 of a pound, in addition to the .4 of a pound above mentioned. This spring means therefore acts in conjunction with the quick action chamber vent which is opened in the service position, to stabilize the operation of the emergency piston against moving the auxiliary slide valve past the service position to the emergency position and thereby effecting an undesired emergency application of the brakes upon a service reduction in brake pipe pressure.

It is possible, particularly after an emergency valve device has been in use for a period of time, that the static as well as kinetic resistance to movement of the piston and auxiliary slide valve may become increased due for instance to accumulation of foreign matter around or on the moving parts, the lack of lubrication, the use of improper lubricants, or for possibly other reasons, and as a result, a differential of pressures exceeding the .4 of a pound will be required to start these parts moving toward service position upon a service reduction in brake pipe pressure.

If the kinetic friction increases substantially in proportion to the increase in static friction, the venting of fluid under pressure from the quick action chamber in service position and the action of the spring will cause the emergency valve device to operate as above described upon a service reduction in brake pipe pressure, even though the static resistance to movement of the parts may require several times the .4 of a pound differential intended, to start the parts moving.

However, if the static resistance to movement becomes relatively high while the kinetic resistance to movement remains relatively low, then when upon a service reduction in brake pipe pressure a differential of pressures is obtained on the emergency piston sufficient to start said piston and the auxiliary slide valve moving, the movement of these parts may be so rapid that the action of the spring plus the venting of fluid under pressure from the quick action chamber in service position of the auxiliary slide valve may not be adequate to ensure that such a reduction in the differential on the piston as necessary to prevent movement of the piston and auxiliary slide valve past the service position will be effected soon enough to prevent such movement.

The principal object of the invention is to provide an improved emergency valve device of the above type having means for ensuring that it will operate as intended upon a service reduction in brake pipe pressure even though the resistance to movement of the parts may change as above described.

Other objects and advantages will be apparent from the following more detailed description of the invention.

In the accompanying drawings, Fig. 1 is a diagrammatic view, mainly in section, of a portion of a fluid pressure brake equipment embodying one form of the invention; Fig. 2 is a sectional view taken on the line 2—2 in Fig. 1; Fig. 3 is a sectional view taken on the line 3—3 in Fig. 1; and Fig. 4 is a diagrammatic view, mainly in section, of a fluid pressure brake equipment embodying another form of the invention.

The portion of the fluid pressure brake equipment shown in Figs. 1 and 4 of the drawings is substantially the same as disclosed in the aforementioned patent, in view of which the following description of parts and operation will be limited only to that deemed necessary to a comprehensive understanding of the invention.

The fluid pressure brake equipment shown in Fig. 1 of the drawings comprises a pipe bracket 1 having one face upon which is mounted an emergency valve device 2 and having another face (not shown) upon which is adapted to be mounted a service application valve device (not shown) which, however, forms no part of the invention. Connected to another face of the pipe bracket is a pipe 3 adapted to lead to an auxiliary reservoir (not shown), a pipe 4 adapted to lead to a brake cylinder pressure retaining valve device (not shown), a pipe 5 which leads to an emergency reservoir 6, a pipe 7 leading to a brake cylinder 8, and a pipe 9 leading to a brake pipe 10.

The emergency valve device 2 comprises a casing containing an emergency piston 11 having at one side a chamber 12 connected to the brake pipe 10 by way of passages 13, 14 and pipe 9, and at the opposite side a valve chamber 15 communicating with a quick action chamber 16 through a passage 17.

The valve chamber 15 contains a main slide valve 18 and an auxiliary slide valve 19 mounted on and adapted to move relative to the main slide valve. The piston 11 is provided with a stem 20 having a recess in which the auxiliary slide valve 19 is disposed so as to be moved with said stem. The main slide valve is loosely disposed between a shoulder 21 formed on the back of the piston 11 and a shoulder 22 provided on the end of the stem and is adapted to be moved by engagement with one or the other of said shoulders according to the direction of movement of the piston.

A movable plunger 23 is mounted in a suitable bore provided in the end of the piston stem 20 and is provided with a guide stem 75 which slidably extends through a bore provided in a nut 76 closing the end of the bore in the piston stem. A spring 24 is interposed between the nut 76 and plunger 23 and acts to urge said plunger into engagement with a shoulder 25 formed in the stem. This shoulder is so located that when the plunger 23 engages same, the outer face of the plunger is beyond the shoulder 22 but spaced from the end of the main slide valve, with the parts positioned as shown in the drawings, a predetermined distance which will be hereinafter defined.

A removable cover 26 is secured to the emergency valve casing over the left hand end of valve chamber 15. This cover is provided with a bore in axial alignment with the piston 11 and in which the cylindrical end of the piston stem 20 is slidably mounted. A cylindrical recess is provided in the cover around the portion in which the end of the piston stem is mounted. This recess is of larger diameter than that of valve chamber 15 so as to form a shoulder 27 on the casing. A movable stop 28 is slidably mounted in this recess and urged against shoulder 27 by means of a spring 29 also contained in said recess and interposed between said stop and the end wall of said recess. This stop is provided with an axial opening through which the end of the piston stem freely extends. The piston stem 20 is however provided with a collar 30 adapted to engage the stop 28 on the portion outside of the axial opening, while the main slide valve 18 is provided with a rearwardly projecting finger 31 also adapted to engage said portion of the stop 28. This engagement of the piston stem 20 and slide valve 18 with the stop 28 is adapted to define the normal position of the piston 11 and said slide valve, as will be hereinafter described. The stop 28 is provided with an opening 32 connecting valve chamber 15 to the recess containing said stop, while the cover 26 is provided with one or more openings 33 connecting said recess to a chamber 34.

A rocking pin 35 is interposed between one face of a flexible diaphragm 36 and the main slide valve 18 and is subject to the pressure of fluid and a spring 37 in a chamber 38 which is adapted under certain conditions to exert seating pressure on the main slide valve. The chamber 38 is adapted to be supplied with fluid under pressure from the emergency reservoir 6 by way of pipe 5 and passages 39 and 40.

Preferably associated with the emergency valve device is a brake pipe vent valve device comprising a piston 41 and a vent valve 42 operatively connected to said piston by means of a stem 43. The vent valve 42 is contained in a chamber 44 in constant communication with the brake pipe 10 through passages 45, 46, 13 and 14, and a spring 47 in said chamber is provided to urge said vent valve into engagement with a seat rib 48 for closing communication from chamber 44 to a chamber 49 which is open to the atmosphere through a passage 50.

The vent valve piston 41 has at one side a chamber 51 connected to a passage 52 which leads to the seat of the main slide valve 18, and has at the opposite side a chamber 53 open to the atmospheric passage 50. A blow-down timing port 54 is provided through the piston 41 connecting chamber 51 to chamber 53, while a leakage groove 55 is provided in the wall of the piston bore also connecting said chambers when said piston is in its normal position, as shown in the drawings.

The equipment as so far described is substantially the same as disclosed in the aforementioned patent, and its operation is briefly as follows.

When the brake pipe 10 is charged with fluid under pressure, fluid under pressure flows therefrom through pipe 9 and passage 14 to passage 13 from whence it flows in a direction toward the left hand to the emergency piston chamber 12 and in a direction towards the right hand to the service portion (not shown) of the equipment. The service portion of the equipment is adapted to operate upon an increase in pressure in brake pipe 10 to supply fluid under pressure to the emergency reservoir 6 for charging same, and to establish communication through which fluid under pressure is released from the brake cylinder 8 to release the brakes, and is adapted to operate upon both a service and an emergency reduction in pressure in brake pipe 10 to supply fluid under pressure from the auxiliary reservoir (not shown) to passage 56 and from thence to brake cylinder 8 for applying the brakes in the same manner as described in the aforementioned patent, which operation however is not pertinent to the invention.

With the parts of the emergency valve device 2 in the normal position, as shown in the drawings, fluid under pressure supplied to chamber 12 upon an increase in brake pipe pressure flows through a restricted feed port 57 to passage 17 and from thence to the emergency valve chamber 15 and quick action chamber 16, thereby charging said chambers with fluid at brake pipe pressure.

With the parts of the emergency valve device in their normal position as shown in the drawings, passage 52 which leads to the vent valve piston chamber 51 is lapped by the main slide valve 18. As a consequence the vent valve piston chamber 51 is at atmospheric pressure, being vented through port 54 and leakage groove 55, which permits spring 47 to seat the vent valve 42 against seat rib 48. With the vent valve 42 seated, the vent valve chamber 44 is charged with fluid supplied from the brake pipe 10 to passage 13 by way of passages 46 and 45.

When a service reduction in brake pipe pressure is effected to effect a service application of the brakes, a corresponding reduction in pressure occurs in the emergency piston chamber 12. Fluid under pressure then tends to flow back from valve chamber 15 and the quick action chamber 16 through the feed port 57 to the piston chamber 12, but this feed port is so restricted that a differential of pressures develops on the opposite sides of the piston 11 upon a service reduction in brake pipe pressure.

When this differential increases to a certain degree, such for instance as .4 of a pound, the piston 11 is adapted to move towards the right hand and move the auxiliary slide valve 19 to service position in which a service port 58 in the auxiliary slide valve registers with a port 59 in the main slide valve 18, which port registers with an atmospheric passage 60. Through the communication thus established, fluid under pressure is adapted to be vented from the valve chamber 15 and quick action chamber 16 at a rate corresponding to the service rate of reduction in brake pipe pressure so as to prevent an increase in the pressure differential on the piston 11. After the service port 58 is moved into registry with port 59 the plunger 23 engages the end of the main slide valve 18 so that further movement of the piston, that is past service position, is opposed by the pressure of spring 24 acting on said plunger.

The spring 24 is provided to act in conjunction with the service venting of fluid under pressure from the quick action chamber 16 through ports 58 and 59 to prevent movement of the emergency piston 11 and auxiliary slide valve 19 past the service position upon a service reduction in brake pipe pressure; and this is accomplished since the differential required on the piston to overcome the pressure of the spring 24 must be increased over the .4 of a pound, a degree such as .5 of a pound. By means of the service venting of fluid under pressure from valve chamber 15 and this stabilizing action of spring 24, movement of the emergency valve device past service position upon a service reduction in brake pipe pressure is therefore prevented under all normal conditions of operation.

When an emergency reduction in brake pipe pressure is effected, the rate of reduction in pressure in piston chamber 12 so exceeds the restricted capacity of ports 58 and 59 to reduce the pressure in valve chamber 15 and quick action chamber 16, that the differential of pressures on the emergency piston 11 promptly increases sufficiently to overcome the pressure of spring 24, whereupon said piston moves the auxiliary slide valve 19 to emergency position which is defined by engagement of shoulder 22 on the piston stem 20 with the left hand end of the main slide valve 18.

In emergency position of the auxiliary slide valve, a port 61 in the main slide valve 18 is open to valve chamber 15 which permits fluid under pressure to flow from valve chamber 15 and the quick action chamber 16 to passage 52 leading to the vent valve piston chamber 51.

This supply of fluid under pressure to the vent valve piston chamber 51 so exceeds the venting capacity of the timing port 54 through the piston 41 and the leakage groove 55 around said piston that sufficient pressure is promptly obtained on said piston to move the vent valve 42 away from seat rib 48 against the opposing pressure of fluid and spring 47 in chamber 44.

With the vent valve 42 unseated fluid under pressure is suddenly vented from the brake pipe 10 through pipe 9, passages 14, 13, 46, 45, chambers 44 and 49 and from thence to the atmosphere through the atmospheric passage 50.

The resultant sudden reduction in brake pipe pressure in the emergency piston chamber 12 increases the differential of pressures on the emergency piston 11 to a degree sufficient for said piston to move the main slide valve 18, whereupon said piston and main slide valve move to a position defined by the engagement of said piston with a gasket 62.

In this position of the main slide valve 18, a cavity 63 therein connects the emergency reservoir passage 39 to a passage 64 which leads to brake cylinder pipe 7, so that fluid under pressure is permitted to flow from the emergency reservoir 6 to the brake cylinder 8 and equalize therein to provide high emergency brake cylinder pressure and thereby an emergency application of the brakes.

In this position of the emergency slide valve 18, passage 52 is opened past the left hand end of said slide valve to the valve chamber 15 so that the supply of fluid from the valve chamber 15 and quick action chamber 16 to the vent valve piston chamber 51 is maintained.

When the vent valve 42 is unseated by piston 41 said piston is moved into sealing engagement with a gasket 65, so as to prevent leakage of fluid under pressure around said piston from chamber 51 to chamber 53. As a result, the fluid under pressure supplied to chamber 51 is permitted to gradually reduce by flow through the timing port 54 to chamber 53 and from thence to the atmosphere through passage 50.

The size of the timing port 54 is so related to the volumes of the valve chamber 15 and quick action chamber 16 that the supply of fluid from said chambers will act to hold the vent valve piston 41 in the position in which the vent valve 42 is unseated for a period of time sufficient to ensure substantially complete venting of fluid under pressure from the brake pipe 10.

When the pressure of fluid in chamber 51 becomes sufficiently reduced to be overcome by the pressure of spring 47, said spring acts to seat the vent valve 42 and return the piston 41 to its normal position, so that, when desired, the pressure in brake pipe 10 may be increased for effecting a release of the brakes and for recharging the brake equipment.

When it is desired to effect a release of the brakes, fluid under pressure is supplied to brake pipe 10 and from thence flows to piston chamber 12. It is customary in charging the brake pipe to initially supply fluid at the high pressure in the usual main reservoir (not shown) directly to the brake pipe, and then after a certain lapse of time supply fluid at the pressure supplied by the usual feed valve device to the brake pipe.

The initial supply of fluid at high pressure to brake pipe 10 causes a rapid increase in pressure in the emergency piston chamber 12 which moves the piston 11 and thereby the slide valves 18 and 19 back to their normal position as shown in the drawings. In this position of piston 11, fluid under pressure is supplied from chamber 12 through the feed port 57 to chambers 15 and 16, but this feed port is so restricted that the differential of pressures on the piston 11 increases to a degree which overcomes the pressure of spring 29 on the stop 28, whereupon said piston moves the slide valves 18 and 19 further toward the left hand to a back-dump position, as defined by engagement between the left hand face of said piston and the casing.

In this back-dump position cavity 63 in the main slide valve 18 connects the brake cylinder passage 64 to a passage 66, so that fluid under pressure is permitted to flow from the brake cylinder 8 to passage 66 and from thence past two serially arranged check valves 67 and 68, through a passage 69 to passage 45 and from thence through passages 46, 13 and 14 and pipe 9 to the brake pipe 10.

This back-dumping of fluid under pressure from the brake cylinder 8 to the brake pipe 10 effects a sudden local increase in brake pipe pressure and provides sufficient increase in brake pipe pressure on the next car in the train to effect back-dump operation of the emergency valve device on that car. In this manner, the emergency valve devices throughout a train operate serially to provide a material increase in brake pipe pressure.

In the back-dump position of the emergency valve device 2, fluid supplied to piston chamber 12 continues to flow through port 57 to the valve chamber 15 and quick action chamber 16. When the pressure of fluid in these chambers is thus increased sufficiently, the pressure of spring 29 acting on the movable stop 28 shifts the piston 11 and slide valves 18 and 19 back to their normal position as shown in the drawings, in which said chambers continue to charge through the feed port 57 until the pressure therein equalizes with that in the brake pipe.

In case the chambers 15 and 16 tend to become charged to a pressure higher than normally carried in the brake pipe 10, as may occur if fluid at the high pressure in the main reservoir (not shown) is supplied to the brake pipe for too long a period of time, two serially arranged check valves 70 and 71 become unseated to permit flow of fluid from said chambers, which are of relatively small volume, to passage 40 and from thence to the emergency reservoir 6, which is of relatively large volume, and therefore able to receive any excess pressure obtained in said chambers.

There is a possibility that after the emergency valve device 2 has been in use the static and perhaps the kinetic resistance to movement of the emergency piston 11 and auxiliary slide valve 19 may become greater than normal due, for instance, to foreign matter, lack of lubrication, the use of improper lubricants or for other reasons.

In case the static resistance to movement of these parts should increase above normal and the kinetic resistance to movement should also increase in proportion, the emergency valve device will operate as above described upon a service reduction in brake pipe pressure with the exception that it will require a differential of pressures greater than for instance .4 of a pound to start the parts moving.

However, in case the kinetic resistance to movement of the parts should remain relatively low while the static resistance to movement should increase to a relatively high value, there is then a possibility that after the parts start moving from their normal position the high differential of pressures acting on the piston would move the parts so fast that the auxiliary slide valve 19 would move through the service position to the emergency position since there would be an insufficient time of registration between ports 58 and 59 to make a reduction in pressure in valve chamber 15 sufficient to coact with spring 24 to destroy the differential of pressures on the piston. If the auxiliary slide valve should thus be moved to emergency position upon a service reduction in brake pipe pressure an emergency application of the brakes on the train would be initiated.

According to the invention, in order to prevent undesired movement of the emergency valve device to emergency position upon a service rate of reduction in brake pipe pressure under the conditions above explained, I provide an auxiliary mechanism which is operative upon a service rate of reduction in brake pipe pressure to augment the differential of pressures on the emergency piston tending to move the piston to service position.

The auxiliary mechanism comprises a movable abutment, preferably in the form of a flexible diaphragm 72 which is clamped to the cover 26 by a plate 74. The cover 26 has an opening 73 open to chamber 34 and one face of the diaphragm 72, so that one face of said diaphragm is thus subject to the pressure of fluid in chamber 34 which is in constant communication with valve chamber 15 through openings 33 and 32. The diaphragm 72 is subject on the opposite face to pressure of fluid in a chamber 77 formed in the cover 74, the chamber 77 being in constant communication with the brake pipe 10 through passages 78 and 14 and pipe 9.

A stem 79 is slidably mounted in a suitable bore in the cover 26 in axial alignment with the diaphragm 72 and is provided on one end with an enlarged plate-like follower 80 disposed in the opening 73 and engaging one face of the diaphargm 72. A follower plate 82 is disposed in chamber 77 in engagement with the diaphragm 72 and is provided with an axial stud 90 extending through the diaphragm 72 and having screw-threaded engagement with the follower 80, so that the diaphragm is firmly clamped between said followers and therefore operatively connected to the stem 79.

The follower stem 79 is provided with an axial bore open at the opposite end of the stem and slidably mounted in this bore is a plunger 81. A spring 82 is interposed between the plunger 81 and a seat 83 which is secured in the bore of stem 79 by means of a snap ring 84, said spring being adapted to urge said plunger in a direction towards the diaphragm.

A lever 85 is disposed in chamber 34 and is fulcrumed near its center on a pin 86 carried by spaced lugs 87 formed on the cover 26. The lower end of this lever is bifurcated to straddle the stem 79 and is connected to a pin 88 which extends through two opposite elongated openings or slots 89 in the stem 79. The plunger 81 is pressed against the pin 88 by the spring 82.

The upper end of the lever 85 is also bifurcated to straddle the opening in the nut 76 through which the stem 75 of the plunger 23 is adapted to move and the two arms thus formed at the upper end of the lever are hook-shaped to engage the nut 76.

In operation, when a reduction in brake pipe pressure is effected, the pressure of fluid in the diaphragm chamber 77 reduces with that in the emergency piston chamber 12, and consequently the same differential of pressures is obtained on the diaphragm 72 as on the piston 11.

This differential of pressures obtained in the diaphragm 72 causes said diaphragm to deflect towards the left hand and act through the spring 82 and plunger 81 on the pin 88 and thereby turn the lever 85 in a clockwise direction about the pin 86. This movement of the lever 85 causes the upper forked ends of said lever to engage the nut 76 in the end of the piston stem 20 and thereby apply to said stem a force proportional to the differential of pressures acting on the diaphragm 72.

The force thus applied through lever 85 to the end of the stem 20 acts in conjunction with the differential of pressures obtained on the emergency piston 11 upon a service reduction in brake pipe pressure to move said piston and the auxiliary slide valve 19 out of their normal position towards service position.

The diaphragm 72 continues to act in the manner just explained until said diaphragm engages the stop lugs 91, after which further movement of the piston 11 and auxiliary slide valve 19 is independent of said diaphragm.

Since the purpose of the diaphragm 72 is to aid the differential of pressures acting on piston 11 to move said piston and the auxiliary slide valve 19 out of normal position in case of high static resistance to movement of said piston and valve, and further since the kinetic resistance to movement of mechanical elements is generally lower than the static resistance, it will be evident that, if desired, the stops 91 may be of such length as to stop deflection of the diaphragm 72 immediately after the piston 11 and auxiliary slide valve 19 start moving from their normal position. However, if desired, the stops 91 may be such as to permit the diaphragm 72 to continue to act in conjunction with the piston 11 until the plunger 23 engages the end of the main slide valve at which time the diaphragm will engage the stops 91. In this latter case the diaphragm 72 will act to ensure movement of the auxiliary slide valve to a position in which the service ports 58 and 59 are in registry but will be cut out of action before the stabilizing spring 24 becomes effective.

By employing a flexible diaphragm to aid the emergency piston 11 to start moving, it will be evident that in case the static resistance to movement of the piston and auxiliary slide valve is increased to a degree over normal, the force necessary to overcome this increase in static resistance is applied by the diaphragm 72, so that movement of the emergency valve device to service position upon a service reduction in brake pipe pressure will not be delayed until a differential of pressures is obtained on the piston 11 which is liable to cause undesired movement of said piston and the auxiliary slide valve 19 past service position to emergency position.

The flexible diaphragm 72 is preferably of such area as to apply to the end of the piston stem 20 a force equal to that obtained on piston 11 upon a reduction in brake pipe pressure, in which case the piston 11 will operate upon a service reduction in brake pipe pressure before a differential, exceeding the .4 of a pound above described, is obtained, even if the static resistance to movement of the piston 11 and auxiliary slide valve 19 should increase one hundred per cent over normal. It will of course be understood that the diaphragm 72 may be of greater or lesser area than above described, so as to be able to counteract a greater or lesser increase in static resistance to movement of the piston and auxiliary slide valve, if desired.

The flexible diaphragm 72 is used in preference to a movable abutment such as piston 11, since the operation of a diaphragm is substantially independent of friction, lubrication and foreign matter and therefore can be relied upon to operate upon substantially the pressure differentials desired. Further, the use of a flexible diaphragm for the purpose above described is practical since the movement of the diaphragm is limited to a very small degree, such as not exceeding one-sixteenth of an inch, which will not materially affect the efficiency of the diaphragm.

It will be noted that in the normal position of the parts of the emergency valve device 2 and diaphragm 72, the end of the diaphragm stem 79 engages the cover in the bottom of the bore in which said stem is mounted. With this condition and the pin 88 engaging the left hand end of slots 89, the upper end of the lever 85 is in substantial engagement with the nut 76 so that upon a reduction in brake pipe pressure the diaphragm may act in its normal and most efficient position to apply pressure to the piston stem 20.

The spring 82 and slots 89 are provided to permit lever 85 to rotate around pin 86 in a counterclockwise direction relative to the diaphragm stem 79 when the emergency valve device 2 is moved to the back-dump position hereinbefore described, and it will be evident that the spring 82 acts in conjunction with the spring 29 to define the differential of pressures required on the emergency piston 11 to move the parts to back-dump position and later to move the parts from back-dump position to the normal position as previously described.

While in the drawings the diaphragm 72 and the parts associated therewith are not shown in axial alignment with the piston stem 20, but instead are disposed below the end of said stem, as viewed in the drawings, and are operatively connected to said stem through the medium of the force transmitting lever 85, it is desired to point out that it is not intended to limit the scope of the invention to such a construction.

Referring now to the modified construction shown in Fig. 4 of the drawings. According to this construction a filler block 93 is interposed between the emergency valve device 2 and pipe bracket 1 which are of the same construction as shown in Fig. 1 of the drawings. The filler block 93 is provided with the required passages for establishing communication between passages 45, 17, 39 and 64 in the emergency valve device 2 and pipe bracket 1.

The flexible diaphragm 72 is disposed in the filler block 93 and is provided at one side with a chamber 94 which is open to passage 17 leading to valve chamber 15 and quick action chamber 16. The diaphragm 72 is provided at the opposite side with a chamber 95 which is open to a passage 96 connecting the brake pipe passage 13 to the emergency piston chamber 12.

A follower plate 97 is disposed in chamber 95 in engagement with one side of the diaphragm 72, while the follower plate 92 is disposed in chamber 94 in engagement with the opposite side of the diaphragm, these followers being clamped to the diaphragm by means of the stud 90 carried by the follower plate 92 and extending through the diaphragm 72 and secured to the follower plate 97 by screw-threaded engagement.

A lever 98 is disposed in chamber 95 and is fulcrumed intermediate its ends on a pin 99. The upper end of the lever 98 is pivotally connected to a pin 100 which is secured in a lug 101 which projects from the follower plate 97. The lower end of lever 98 is preferably bifurcated to straddle one end of a link 102 and carries a pin 103 which extends through a slot 104 in said link. The opposite end of the link is pivotally connected to a pin 105 which is secured to a lug 106 projecting from the brake pipe face of the emergency piston 11.

In this embodiment of the invention it will be noted that a cover 107 is employed in place of cover 26 to carry the end of the emergency piston stem 20, the movable stop 28 and spring 29 and to form one side of the vent valve piston chamber 51.

It will be noted that in the construction just described, the flexible diaphragm 72 is subject in chamber 95 to brake pipe pressure and in chamber 94 to the pressure of fluid in valve chamber 15 and quick action chamber 16, so that upon a reduction in brake pipe pressure, the diaphragm 72 is subjected to the same differential of pressures as the emergency piston 11, as is the case in the construction shown in Fig. 1.

When the parts of the emergency valve device and when the diaphragm 72 are in their normal position, as shown in the drawings, the pin 103 engages the right hand end of the slot 104.

Upon a service reduction in pressure in brake pipe 10 and consequently in the emergency piston chamber 12 and diaphragm chamber 95, a differential of pressures is established on the piston 11 which urges said piston in a direction towards the right hand. The same differential of pressures is obtained on the diaphragm 72 which urges said diaphragm in the opposite direction, but since said diaphragm is connected through lever 98 to link 102, the force of the differential of pressures acting on said diaphragm is applied to the piston to assist it in moving towards the right hand, as will be evident.

In case the resistance to movement of the piston 11 and auxiliary slide valve 19 is greater than normal, it will be evident that the force of the diaphragm transmitted through the lever 98 and link 102 to the piston 11 will ensure that said piston starts moving before a differential of pressures is obtained on said piston which would be liable to cause undesired movement of said piston and the auxiliary slide valve 19 to emergency position.

The movement of the diaphragm 72 upon a reduction in brake pipe pressure and the consequent extent of action of said diaphragm on the emergency piston 11 may be the same as in the construction shown in Fig. 1. In the construction shown in Fig. 4, the movement of the diaphragm is limited by engagement of the follower plate 97 with a stop rib 110 and is just sufficient to cut the diaphragm out of action at about the time the plunger 23 in the end of the piston stem 20 engages the end of the main slide valve 18.

After the diaphragm is cut out of action upon a reduction in brake pipe pressure, as just described, the slot 104 in the link permits the piston 11 to move further towards the right hand relative to the lever 98, as is required in effecting an emergency application of the brakes. It will therefore be evident that except for the action of the diaphragm 72 on the piston 11 through a limited initial portion of the movement of the piston 11 from normal position, the emergency valve device operates upon a reduction in brake pipe pressure in the same manner as in the construction shown in Fig. 1 and disclosed in the aforementioned patent.

In effecting a release of the brakes after an emergency application, the flexible diaphragm 72 is deflected towards the right hand into engagement with a stop rib 111 and this permits back-dump operation of the emergency valve device independently of the diaphragm, in the same manner as disclosed in the aforementioned patent, it being noted that in this construction there is no spring, such as spring 82 shown in the construction disclosed in Fig. 1, other than spring 29 which controls the back-dump operation. When the opposing fluid pressures on the emergency piston 11 and flexible diaphragm 72 equalize after the back-dump operation and the emergency valve device 2 returns to its normal position, it will be evident that the internal forces in the diaphragm 72 will also cause it to return to its normal position, as shown in the drawings.

It will now be noted that according to the invention means are provided which are adapted to be associated with an emergency valve device of the type disclosed in the aforementioned patent and which are operative to ensure that the emergency valve device will operate to effect venting of fluid under pressure from the quick action chamber as required to prevent an undesired emergency application of the brakes upon a service reduction in brake pipe pressure.

While two illustrative embodiments of the invention have been described in detail, it is not my intention to limit its scope to these embodiments or otherwise than by the terms of the appended claims.

Having now described my invention, what I claim as new and desire to secure by Letters Patent, is:

1. In a fluid pressure brake, in combination, a brake pipe, a chamber normally charged with fluid at the pressure in said brake pipe, a piston controlled by the opposing fluid pressures in said brake pipe and chamber and movable upon a reduction in brake pipe pressure, a movable abutment also controlled by the opposing fluid pressures in said brake pipe and chamber, and means operated by said movable abutment upon a reduction in brake pipe pressure to assist the differential of fluid pressures obtained on said piston on said reduction in brake pipe pressure to move said piston.

2. In a fluid pressure brake, in combination, a brake pipe, a chamber normally charged with fluid at the pressure in said brake pipe, a piston controlled by the opposing fluid pressures in said brake pipe and chamber and movable upon a reduction in brake pipe pressure, a flexible diaphragm also controlled by the opposing fluid pressures in said brake pipe and chamber, and means operated by said flexible diaphragm upon a reduction in brake pipe pressure to assist the differential of fluid pressures obtained on said piston on said reduction in brake pipe pressure to move said piston.

3. In a fluid pressure brake, in combination, a brake pipe, a chamber normally charged with fluid at the pressure in said brake pipe, a piston controlled by the opposing fluid pressures in said brake pipe and chamber and having a normal position and adapted to be moved from said normal position to another position upon a reduction in brake pipe pressure, a flexible diaphragm also controlled by the opposing pressures of said brake pipe and chamber, and means operated by said diaphragm upon a reduction in brake pipe pressure to apply force to said piston to assist the differential of fluid pressures obtained on said piston upon said reduction in brake pipe pressure to start said piston moving from said normal position towards said other position.

4. In a fluid pressure brake, in combination, a brake pipe, a chamber normally charged with fluid at the pressure in said brake pipe, a piston controlled by the opposing fluid pressures in said brake pipe and chamber and having a normal position and adapted to be moved from said normal position to another position upon a reduction in brake pipe pressure, a flexible diaphragm also controlled by the opposing pressures of said brake pipe and chamber, and means operated by said diaphragm upon a reduction in brake pipe pressure to apply force to said piston to assist the differential of fluid pressures obtained on said piston upon said reduction in brake pipe pressure to move said piston from said normal position a predetermined distance towards the other position.

5. In a fluid pressure brake, in combination, a brake pipe, a chamber normally charged with fluid at the pressure in said brake pipe, a piston controlled by the opposing fluid pressures in said brake pipe and chamber and having a normal position and adapted to be moved from said normal position to another position upon a reduction in brake pipe pressure, a flexible diaphragm also controlled by the opposing pressures of said brake pipe and chamber, and means operated by said diaphragm upon a reduction in brake pipe pressure to apply force to said piston to assist the differential of fluid pressures obtained on said piston upon said reduction in brake pipe pressure to move said piston from said normal position to said other position.

6. In a fluid pressure brake, in combination, a brake pipe, a chamber normally charged with fluid at the pressure in said brake pipe, a piston controlled by the opposing fluid pressures in said brake pipe and chamber and having a normal position and adapted to be moved from said normal position to another position upon a reduction in brake pipe pressure, a flexible diaphragm also controlled by the opposing pressures of said brake pipe and chamber, means operative by said diaphragm upon a reduction in brake pipe pressure to apply force to said piston to assist the differential of fluid pressures obtained on said piston upon said reduction in brake pipe pressure to move said piston, and means operative to relieve said piston of the force applied by operation of said diaphragm upon a predetermined movement of said piston.

7. In a fluid pressure brake, in combination, a brake pipe, a quick action chamber normally charged with fluid at the pressure in said brake pipe, an emergency piston controlled by the opposing pressures of said brake pipe and said chamber, a valve having a normal position and movable by said piston upon a reduction in brake pipe pressure from said normal position to a service position for effecting a service rate of reduction in pressure in said chamber, and means also controlled by the opposing pressures of said brake pipe and chamber and operative upon a service rate of reduction in brake pipe pressures to apply force to said piston to assist said reduction in brake pipe pressure on said piston to move said valve from said normal position.

8. In a fluid pressure brake, in combination, a brake pipe, a quick action chamber normally charged with fluid at the pressure in said brake pipe, an emergency piston controlled by the opposing pressures of said brake pipe and said chamber, a valve having a normal position and movable by said piston upon a reduction in brake pipe pressure from said normal position to a service position for effecting a service rate of reduction in pressure in said chamber, a flexible diaphragm also subject to the opposing pressures of said brake pipe and chamber, and means for transmitting to said piston the force developed by the differential of fluid pressures created on said diaphragm upon a reduction in brake pipe pressure, whereby said force acts with the differential of fluid pressures created on said piston upon said reduction in brake pipe pressure to move said valve from said normal position.

9. In a fluid pressure brake, in combination, a brake pipe, a quick action chamber normally charged with fluid at the pressure in said brake pipe, an emergency piston controlled by the opposing pressures of said brake pipe and said chamber, a valve having a normal position and movable by said piston upon a reduction in brake pipe pressure from said normal position to a service position for effecting a service rate of reduction in pressure in said chamber, means including a flexible diaphragm also subject to the opposing pressures of said brake pipe and chamber and operative upon a reduction in brake pipe pressure to assist the differential of fluid pressures on said piston to move said valve, and means for relieving said piston of force transmitted from said diaphragm after a predetermined movement of said piston from normal position.

10. In a fluid pressure brake, in combination, a brake pipe, a quick action chamber normally charged with fluid at the pressure in said brake pipe, an emergency piston controlled by the opposing pressures of said brake pipe and said chamber, a valve having a normal position and movable by said piston upon a reduction in brake pipe pressure from said normal position to a service position for effecting a service rate of reduction in pressure in said chamber, and adapted to be moved further to an emergency position to effect an emergency brake operation, a flexible diaphragm also subject to the opposing pressures of said brake pipe and chamber and operative upon a reduction in brake pipe pressure to assist the differential of fluid pressures on said piston to move said valve, and means operative to relieve said piston of force from said diaphragm upon a predetermined movement of said piston.

11. In a fluid pressure brake, in combination, a brake pipe, a quick action chamber normally charged with fluid at the pressure in said brake pipe, an emergency piston controlled by the opposing pressures of said brake pipe and said chamber, a valve having a normal position and movable by said piston upon a reduction in brake pipe pressure from said normal position to a service position for effecting a service rate of reduction in pressure in said chamber, and adapted to be moved further to an emergency position to effect an emergency brake operation, spring means for opposing movement of said piston and valve from service position to emergency position, means including a flexible diaphragm also subject to the opposing pressures of the brake pipe and said chamber and operative upon a reduction in brake pipe pressure to assist the differential of fluid pressures on said piston to move said valve from normal position, and means operative to relieve said piston of force from said diaphragm before said spring means becomes effective.

12. In a fluid pressure brake, in combination, a brake pipe, a quick action chamber normally charged with fluid at the pressure in said brake pipe, a piston subject to the opposing pressures of said brake pipe and chamber, a valve having a normal position and adapted to be moved therefrom by said piston upon a service rate of reduction in brake pipe pressure to a service position for effecting a service rate of reduction in pressure in said chamber, a spring operative to assist the differential of fluid pressures obtained on said piston upon a service reduction in brake pipe pressure to move said piston and valve from said normal position, means operative upon a reduction in brake pipe pressure to cause said spring to act to assist movement of said piston and valve, and means for limiting the range of assisting action of said spring to a predetermined movement of said piston and valve from said normal position.

13. In a fluid pressure brake, in combination, a brake pipe, a quick action chamber normally charged with fluid at the pressure in said brake pipe, a piston subject to the opposing pressures of said brake pipe and chamber, a valve having a normal position and adapted to be moved therefrom by said piston upon a service rate of reduction in brake pipe pressure to a service position for effecting a service rate of reduction in pressure in said chamber, and adapted to be moved by said piston upon an emergency reduction in brake pipe pressure past service position to an emergency position for effecting an emergency operation, means operative upon a reduction in brake pipe pressure to assist the differential of fluid pressures obtained on said piston to move said piston and valve out of normal position towards service position, and means for rendering the assisting means ineffective after a predetermined movement of said piston and valve from said normal position, said piston and valve being movable relative to said assisting means from service position to emergency position.

14. In a fluid pressure brake, in combination, a brake pipe, a quick action chamber normally charged with fluid at the pressure in said brake pipe, a piston subject to the opposing pressures of said brake pipe and chamber, a valve having a normal position and adapted to be moved therefrom by said piston upon a service rate of reduction in brake pipe pressure to a service position for effecting a service rate of reduction in pressure in said chamber, and adapted to be moved by said piston upon an emergency reduction in brake pipe pressure past service position to an emergency position for effecting an emergency operation, a flexible diaphragm also subject to the opposing pressures of said brake pipe and chamber, lever means operative by said diaphragm upon a reduction in brake pipe pressure to transmit pressure of said diaphragm to said piston to assist the differential of fluid pressures on said piston to move said piston and valve, and means for rendering said diaphragm and lever means ineffective to assist movement of said piston and valve after a predetermined movement of said piston and valve from normal position.

15. In a fluid pressure brake, in combination, a brake pipe, a quick action chamber normally charged with fluid at the pressure in said brake pipe, a piston subject to the opposing pressures of said brake pipe and chamber, a valve having a normal position and adapted to be moved therefrom by said piston upon a service rate of reduction in brake pipe pressure to a service position for effecting a service rate of reduction in pressure in said chamber, and adapted to be moved by said piston upon an emergency reduction in brake pipe pressure past service position to an emergency position for effecting an emergency operation, a flexible diaphragm also subject to the opposing pressures of said brake pipe and chamber, and lever means operative by said diaphragm upon a reduction in brake pipe pressure to transmit pressure of said diaphragm to said piston to assist the differential of fluid pressures on said piston to move said piston and valve, said piston and valve being movable relative to said lever and diaphragm between service and emergency positions.

16. In a fluid pressure brake, in combination, a brake pipe, a quick action chamber normally charged with fluid at the pressure in said brake pipe, a piston subject to the opposing pressures of said brake pipe and chamber, a valve having a normal position and adapted to be moved therefrom by said piston upon a service rate of reduction in brake pipe pressure to a service position for effecting a service rate of reduction in pressure in said chamber, and adapted to be moved by said piston upon an emergency reduction in brake pipe pressure past service position to an emergency position for effecting an emergency operation, a flexible diaphragm also subject to the opposing pressures of said brake pipe and chamber, and lever means operative by said diaphragm upon a reduction in brake pipe pressure to apply the pressure of said diaphragm to the quick action chamber side of said piston to assist the differential of fluid pressures acting on said piston to move said piston and valve.

17. In a fluid pressure brake, in combination, a brake pipe, a quick action chamber normally charged with fluid at the pressure in said brake pipe, a piston subject to the opposing pressures of said brake pipe and chamber, a valve having a normal position and adapted to be moved therefrom by said piston upon a service rate of reduction in brake pipe pressure to a service position for effecting a service rate of reduction in pressure in said chamber, and adapted to be moved by said piston upon an emergency reduction in brake pipe pressure past service position to an emergency position for effecting an emergency operation, a flexible diaphragm also subject to the opposing pressures of said brake pipe and chamber, and lever means operative by said diaphragm upon a reduction in brake pipe pressure to apply the pressure of said diaphragm to the brake pipe side of said piston to assist the differential of fluid pressures acting on said piston to move said piston and valve, and means operative to relieve said piston of the pressure of said diaphragm after a predetermined movement of said piston and valve out of normal position.

18. In a fluid pressure brake, in combination, a brake pipe, a brake cylinder, a quick action chamber normally charged with fluid at brake pipe pressure, a piston subject to the opposing pressures of said brake pipe and chamber, valve means having a normal position and adapted to be moved by said piston to a service position upon a service reduction in brake pipe pressure to effect a service reduction in pressure in said chamber, and adapted to be moved by said piston to an emergency position upon an emergency reduction in brake pipe pressure to supply fluid under pressure to said brake cylinder, and adapted to be moved by said piston to a back-dump position upon an increase in brake pipe pressure to vent fluid under pressure from said brake cylinder to said brake pipe, and means operative upon a reduction in brake pipe pressure to apply force to said piston for assisting the differential of pressures obtained on said piston to move said valve means from normal position towards service position, said piston and valve means being movable to emergency and back-dump positions independently of said assisting means.

19. In a fluid pressure brake, in combination, a brake pipe, a brake cylinder, a quick action chamber normally charged with fluid at brake pipe pressure, a piston subject to the opposing pressures of said brake pipe and chamber, valve means having a normal position and adapted to be moved by said piston to a service position upon a service reduction in brake pipe pressure to effect a service reduction in pressure in said chamber, and adapted to be moved by said piston to an emergency position upon an emergency reduction in brake pipe pressure to supply fluid under pressure to said brake cylinder, and adapted to be moved by said piston to a back-dump position upon an increase in brake pipe pressure to vent fluid under pressure from said brake cylinder to said brake pipe, a spring operative to assist the differential of pressures obtained on said piston upon a reduction in brake pipe pressure to move said piston and valve means out of said normal position towards service position and to oppose movement of said piston and valve means to back-dump position, a flexible diaphragm operative upon a reduction in brake pipe pressure to render said spring effective to assist, and means for rendering said spring ineffective to assist movement of said piston and valve means past service position to emergency position.

20. In a fluid pressure brake, in combination, a brake pipe, an emergency valve device having a piston subject to the opposing pressures of the brake pipe and a chamber and movable upon a reduction in brake pipe pressure, and a flexible diaphragm also subject to the opposing pressures of the brake pipe and said chamber and operatively connected to said piston to assist movement of said piston upon a reduction in brake pipe pressure.

21. In a fluid pressure brake, in combination, a brake pipe, a quick action chamber normally charged with fluid under pressure, an emergency piston subject to the opposing pressures of said brake pipe and chamber and having a normal position and adapted to be moved therefrom upon a service reduction in brake pipe pressure to a service position and upon an emergency reduction in brake pipe pressure to an emergency position, a flexible diaphragm subject on one face to brake pipe pressure and on the opposite face to the pressure of fluid in said chamber, means connecting said diaphragm to said piston whereby upon a reduction in brake pipe pressure the differential of pressures developed on said diaphragm is applied to said piston to assist the differential of fluid pressures acting on said piston to move said piston, and means for limiting the deflection of said diaphragm for thereby rendering same ineffective to assist in moving said piston after said piston and valve have moved out of said normal position a predetermined distance, said piston being movable from service position to emergency position independently of said diaphragm.

CLYDE C. FARMER.